Figure 1:
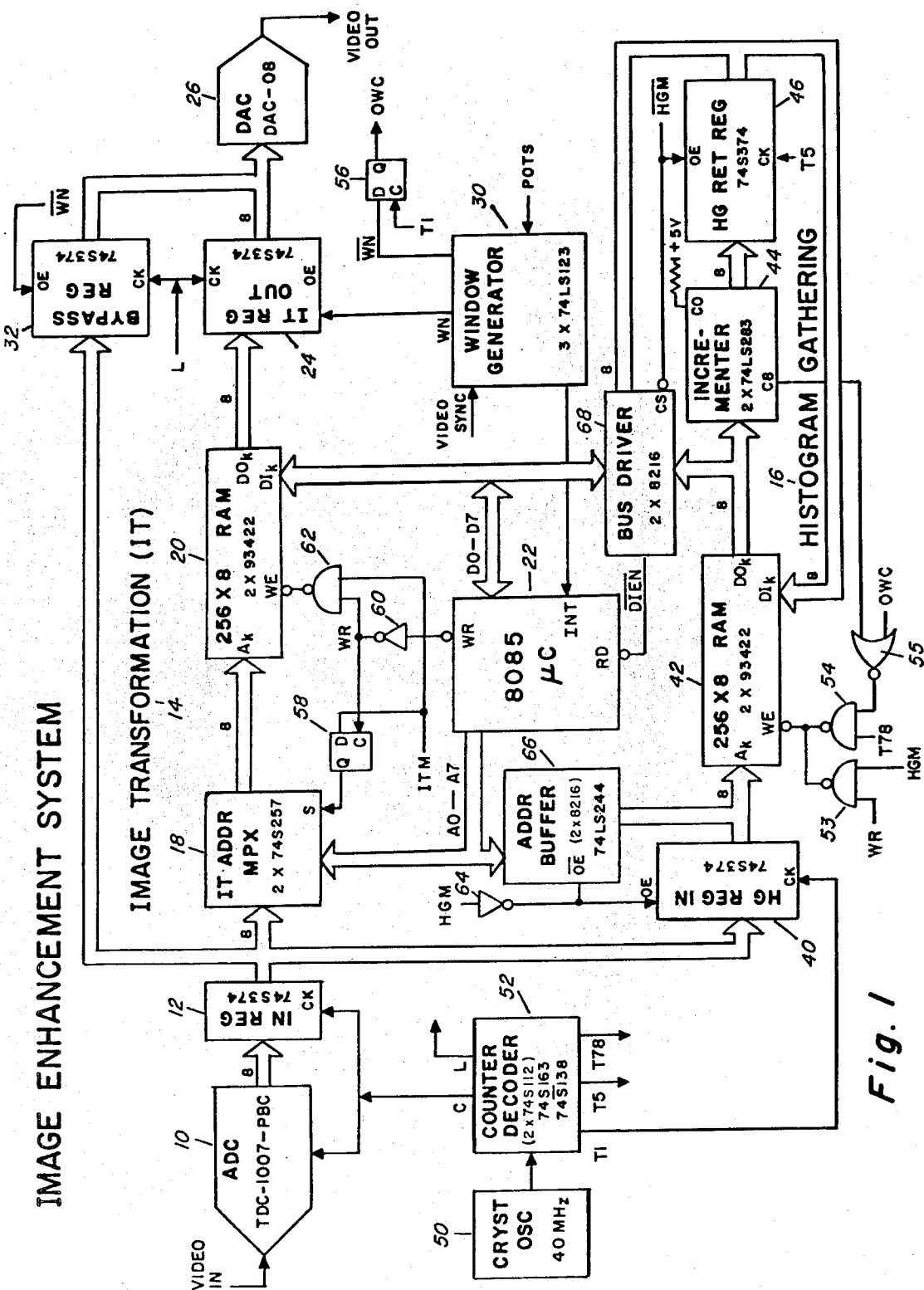

United States Patent [19]
Ruhman et al.

[11] 4,365,304
[45] Dec. 21, 1982

[54] METHOD AND APPARATUS FOR ON-LINE DATA ENHANCEMENT

[75] Inventors: Smil Ruhman, Rehovot; Zvi Orbach, Kiryat Ono, both of Israel

[73] Assignee: Yeda Research & Development Co., Ltd., Rehovot, Israel

[21] Appl. No.: 169,490

[22] Filed: Jul. 16, 1980

[30] Foreign Application Priority Data

Aug. 27, 1979 [IL]  Israel .................................. 58119

[51] Int. Cl.³ .................... G06F 15/36; H04N 3/00
[52] U.S. Cl. .................................. 364/515; 358/166; 364/553
[58] Field of Search ................. 364/515, 553; 358/37, 358/166, 284

[56] References Cited

U.S. PATENT DOCUMENTS

| | | | |
|---|---|---|---|
| 3,979,555 | 9/1976 | Opitter et al. | 358/166 X |
| 3,983,320 | 9/1976 | Ketcham et al. | 358/166 |
| 3,996,421 | 12/1976 | Pruznick et al. | 358/166 |
| 4,214,271 | 7/1980 | Jones et al. | 358/166 |

*Primary Examiner*—Jerry Smith
*Attorney, Agent, or Firm*—Browdy and Neimark

[57] ABSTRACT

Apparatus for on-line data enhancement including apparatus for receiving data, apparatus for applying a histogram transformation to the received data including a look-up table embodied in a rewritable memory; apparatus for determining the histogram transformation in response to a histogram of the received data; and apparatus for producing a histogram of the received data.

19 Claims, 4 Drawing Figures

METHOD AND APPARATUS FOR ON-LINE DATA ENHANCEMENT

The present invention relates to apparatus and techniques for transmission of data and enhancement thereof generally and more particularly to techniques for enhancement and compression of images and other data.

Image enhancement by histogram modification has been considered traditionally to be a task which requires a large amount of computer capacity and computation time. It has therefore not been applicable to video images except on an off-line basis.

Known techniques for image enhancement by histogram modification involve the computation of a monotonic transformation function which, when applied to the original image, produces an output histogram approximating a desired distribution function. A transformation may be designed, for example, to provide a uniform output distribution. One technique employing such a simple transformation is known as histogram equalization and is described in an article by Robert Hummel entitled "Image Enhancement by Histogram Transformation" in Computer Graphics and Image Processing Vol. 6 No. 2, P. 184-195, (1977). This technique produces an output distribution with undiminished peaks, not truly uniform but tending towards uniformity when averaged locally over several gray levels. Contrast is much improved, however, because heavily populated gray levels are moved further apart. In practice histogram equalization results in a significant increase in visual clarity.

Another technique for image enhancement by histogram modification is described in an article by Werner Frei entitled Image Enhancement By Histogram Hyperbolization in Computer Graphics & Image Processing Vol. 6, pp. 286-294, (June 1977).

The present invention seeks to provide apparatus and a method for on-line data enhancement which enable histogram modification to be used economically and practically for video images and other changing data transmissions.

There is thus provided in accordance with an embodiment of the present invention apparatus for on-line data enhancement comprising apparatus for receiving data; apparatus for applying a histogram transformation to the received data including a look-up table embodied in a rewritable memory; apparatus for determining the histogram transformation in response to a histogram of the received data; and apparatus for producing a histogram of the received data.

Further in accordance with an embodiment of the present invention the apparatus for determining the histogram transformation updates the transformation periodically.

Additionally in accordance with an embodiment of the invention, the apparatus is microprocessor controlled.

Still further in accordance with an embodiment of the invention there is provided apparatus for selectably determining what portion of the received data is subject to transformation.

Also in accordance with an embodiment of the invention there is provided a method for applying a histogram transformation to received data comprising the steps of producing a histogram of the received data; generating a histogram transformation on the basis of the desired output characteristics and on the basis of the histogram and inserting it in a look up table embodied in a rewritable memory; and applying the received data to the look up table for histogram transformation thereof.

Additionally in accordance with an embodiment of the invention apparatus and techniques for data compression by adaptive quantization are provided.

Figure 2:
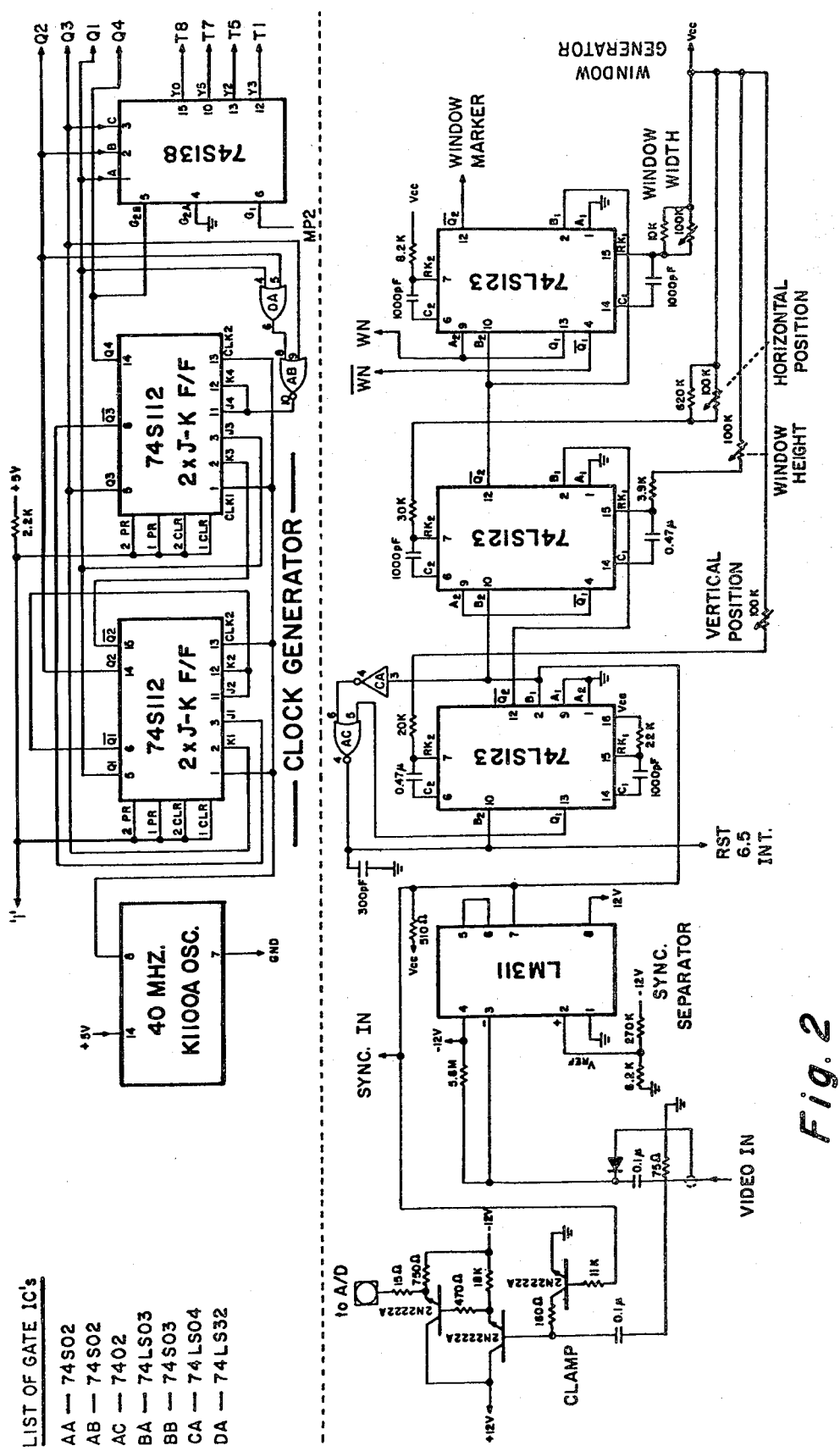
Figure 3:
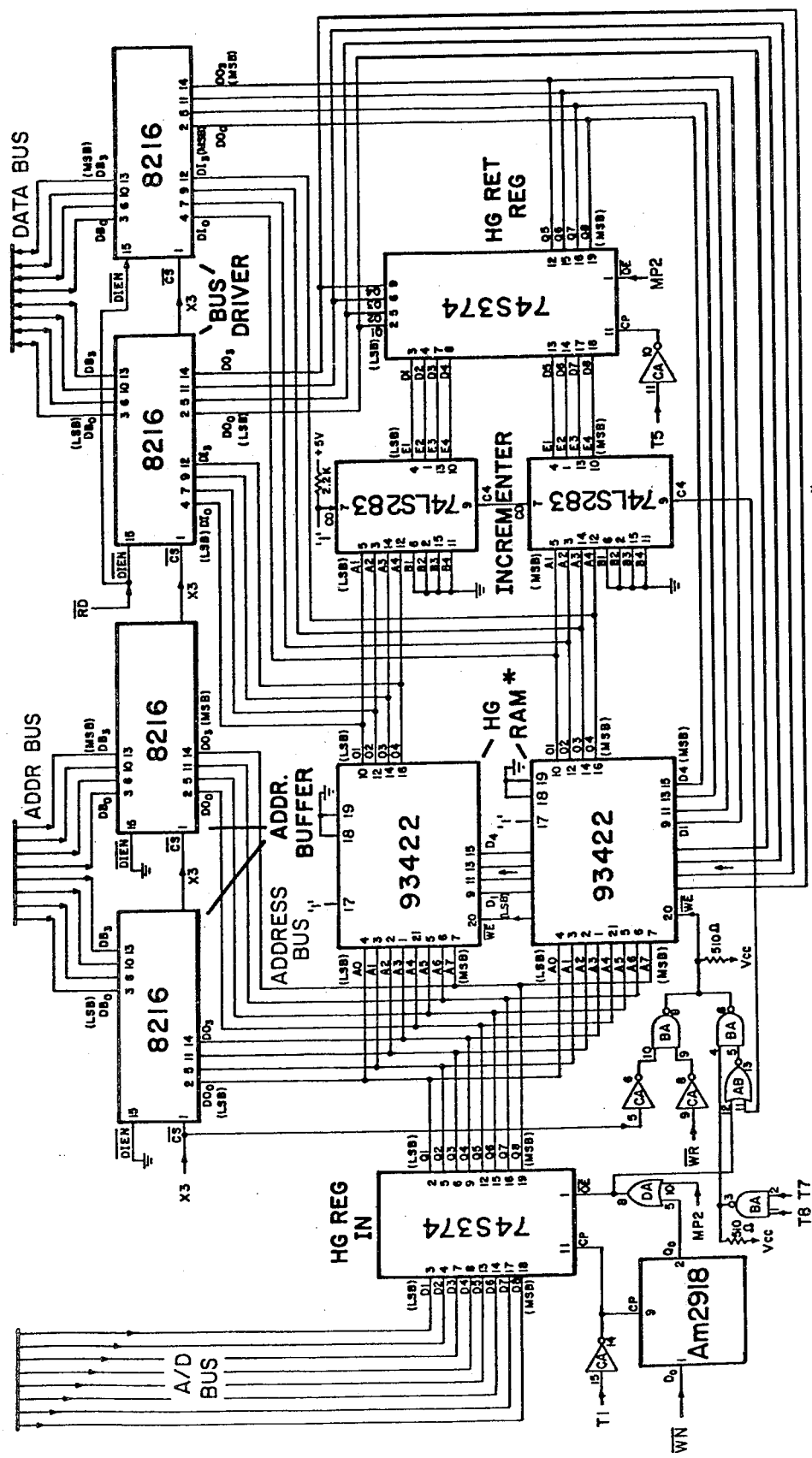
Figure 4:
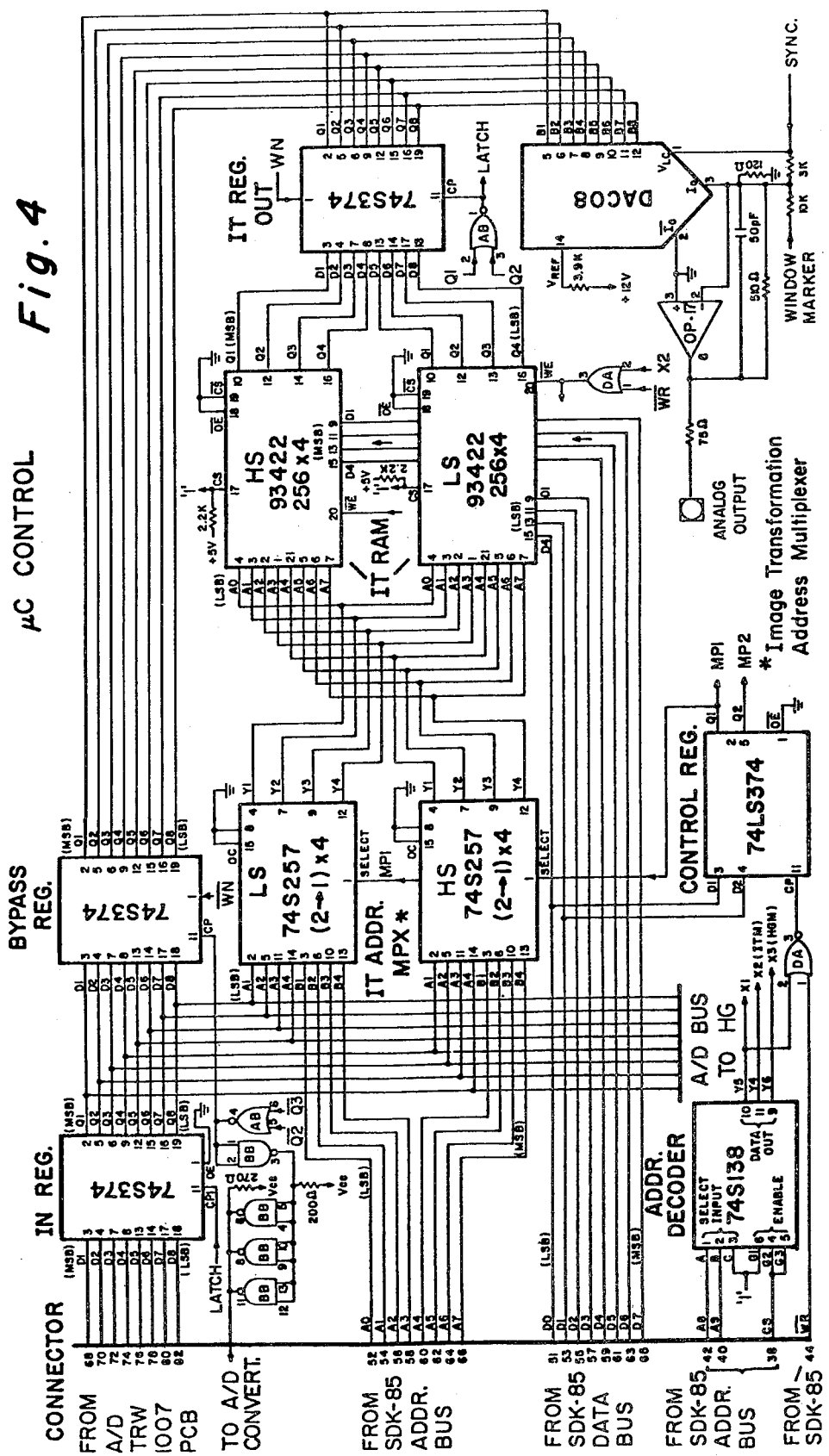

The invention will be more fully understood and appreciated from the following detailed description taken in conjunction with the drawings in which:

FIG. 1 is a block diagram illustration of image enhancement apparatus constructed and operative in accordance with an embodiment of the present invention; and FIGS. 2 to 4 are detailed schematic illustrations of the image enhancement apparatus of FIG. 1.

A preferred embodiment of the invention will now be described with particular reference to the enhancement of video images, but without limitation of the invention to video images.

Reference is now made to FIG. 1 which is a block diagram of image enhancement apparatus constructed and operative in accordance with an embodiment of the present invention. A video signal, which has been clamped to a predetermined D.C. level and stripped of its synchronization pulses by conventional apparatus (not shown), is sampled every 100 nanoseconds by an 8-bit analog-to-digital converter 10, such as a TDC 1007-PBC. The output byte from A-D converter 10 is supplied to an input register 12 which provides outputs to image transformation and histogram gathering subsystems 14 and 16 respectively.

Considering first the image transformation subsystem, the output from input register 12 is supplied via an IT address multiplexer 18, which typically comprises 2 74S257 chips, to the address input of a 256×8 RAM 20, typically comprising 2 93422 chips, as a pixel value. RAM 20 operates as a look-up table and provides for each pixel level, an 8 bit output which represents the gray level assigned to the particular image brightness represented by the pixel level. RAM 20 is capable to perform any transformation function expressible by a 256-item table and receives control inputs along a control bus from a CPU such as an 8085 microcomputer 22. It is appreciated that since histogram modification involves only monotonic transformation functions, the relation between the received and modified grey levels is such that their relative position is maintained although their spacing may be altered.

The 8 bit output from RAM 20 is supplied to an IT output register 24, such as a 74S374 chip, and the output of register 24 is supplied to a digital-to-analog converter 26 such as a DAC 08 whose output is the transformed video signal, to which the synchronization pulses are restored.

A window generator 30, typically comprising three 74LS123 chips is operated by four manually operated potentiometers of conventional construction (not shown) and is operative to define a window which may be any portion or the whole of the video image for which transformation is desired. The portions of the video signal relating to locations outside the window are not transformed and appear at the output of D-A converter 26 exactly as received. Window generator 30 provides a control signal $\overline{WN}$ and its inverse WN which are supplied to the IT output register 24 and to a bypass register 32 respectively for controlling the operation thereof. Bypass register 32 receives an input directly from input register 12 and outputs to D-A converter 26.

The control signals WN and $\overline{WN}$ are received at the respective registers 32 and 24 at their tristate output enables for governing which signals they output.

Considering now the histogram gathering subsystem 16, it is seen that an HG input register 40 such as a 74S374 chip receives the 8-bit output from input register 12 and supplies a pixel output to the address input of a 256×8 RAM 42 which stores histogram data. In response to each address representing a given level, RAM 42 reads out its contents for that level to an incrementer 44, typically comprising two 74LS283 chips, for recording the occurrence of the given grey level. The incrementer 44 outputs the gray-level information to an HG return register 46 such as a 74S374 chip, which returns the incremented data to its original memory location in RAM 42.

According to a preferred embodiment of the invention only every fourth pixel input from input register 12 is logged in RAM 42 in order to avoid widespread saturation of the histogram memory in a single field duration.

It is noted that the apparatus here described has three time bases: the video synchronization signals, the internal clock of the 8085 microprocessor and a 40 MHz crystal oscillator 50. Oscillator 50 outputs to a counter decoder 52, typically comprising a 74S138 and two 74S112 chips, which provides the following timing signals: C, L, T1, T5, T78.

It is appreciated that no attempt is made to synchronize the three time bases since there is little interaction therebetween. When such interaction does occur, synchronization may be inherent, as happens, for example, when the microprocessor 22 is interrupted by the onset of vertical blanking of the video signal. One example of explicit synchronization occurs in the limitation of histogram gathering to the area of the window defined by the window generator 30. This is accomplished by preventing write-back to RAM 42 for areas outside the window, by using a signal derived from $\overline{WN}$ to gate off enable WE. The inverted input to WE is coupled to the outputs of a pair of parallel NAND gates 53 and 54. NAND gate 53 receives a WR input from microprocessor 22 and an HGM input whose origin will be described hereinafter. NAND gate 54 receives the T78 input from counter decoder 52 and the output from a NOR gate 55, which receives the OWC output from a D flip flop 56 and the C8 output from incrementer 44. Flip flop 56 receives the $\overline{WN}$ signal at its D input and the T1 timing signal at its C input.

It is not important whether a pixel lying on the border of the window is or is not included in the histogram. Synchronization is required to prevent gating off in the middle of a write back, which could result in a gross error.

The incrementation of the data in a location in memory 42 beyond its capacity of 255, which would cause a gross error, is prevented by inhibiting write back whenever incrementer 44 indicates an output carry.

The operation of CPU 22 will now be described. At the onset of vertical blanking, the CPU receives an interrupt signal and moves the histogram data gathered during the preceding field into its main memory and clears the HG RAM 42. What happens next depends on whether or not it is time to recompute the transformation function. If not, the Histogram Gathering subsystem 16 is released to log pixel distribution during the next field, while the CPU adds the previous partial histogram into the cumulative histogram stored in the main memory.

If it is time to compute a new function, the histogram gathering subsystem 16 is inhibited, since the processor is too busy to handle new data. The CPU 22 is busy computing for most of a frame. At the end of the second field, the CPU loads the newly computed transformation function into IT RAM 20, and releases histogram gathering subsystem 16 for operation.

For the 60 Hz EIA video standard, computation time occasionally exceeds one frame. In that case, the new function is transferred and histogram gathering is released after three fields.

The periodicity of recomputation of the transformation function is selected by the user by operation of a 9 position selector switch located on the front panel of the apparatus. The switch selects a quantity K—0, 1, ... 8 which sets histogram gathering at $2^K$ fields. Since two fields are taken for computation, the transformation function is recomputed every $2^K+2$ fields.

An exception occurs for the shortest cycle when K=0. Here the sequence is streamlined so that the transformation function is renewed every frame based on data gathered during a single field. Assuming that histogram data has been gathered for one field and it is time to compute a new function, histogram gathering is inhibited during the first field of computation and is released during the second field when computation continues. At the end of the second field, the CPU loads the newly computed transformation function into IT RAM 20, brings the histogram data into the main memory, clearing HG RAM 42 as usual, inhibits histogram gathering, and launches a new computation cycle.

Selection of a higher K helps to average out noise, particularly when a relatively small window is used and the histogram data is sparse. In such a case, however, the histogram must be static over *system lag time* which is defined as the time elapsed from the onset of a histogram gathering period until use of the function generated therefrom terminates. For the 50 Hz CCIR video standard, the following table gives system lag time as a function of K.

| K | 0 | 1 | 2 | 3 | 4 | 5 | 6 | 7 | 8 |
|---|---|---|---|---|---|---|---|---|---|
| Sys. lag | 0.10 | 0.16 | 0.24 | 0.40 | 0.72 | 1.36 | 2.64 | 5.2 | 10.32 sec. |

Control of the independent subsystems by the CPU will now be briefly described: The CPU 22 considers the IT and HG RAMS 20 and 42 respectively, as part of its own memory (addressed by 9400 and 9600 hex. respectively), and employs memory select and the read ($\overline{RD}$) and write ($\overline{WR}$) control signals to gate required busses for controlling the RAM operation. The memory select signals for IT RAM 20 and HG RAM 42 are labeled ITM and HGM respectively.

When the CPU 22 has a new transformation function to transfer to the IT RAM 20, it waits to be interrupted by the vertical blank signal, sets up ITM and starts to issue a series of write instructions. The first WR clocks ITM into a D flip-flop 58, such as a 74LS374, which receives the WR signal at its C input from CPU 22 via an inverter 60. These two inputs are also supplied to an NAND gate 62 which outputs to the inverted input WE of RAM 20. Flip-flop 58 serves to select the CPU address bus into IT RAM 20. So long as NAND gate 62 enables the WE input of RAM 20, the RAM remains in a write mode.

The operation of fetching a partial histogram from HG RAM 42 is effected in a similar manner, except in this case more busses must be controlled. A signal $\overline{HGM}$ applied via an inverter 64 to the OE input of HG input register 40, disables the output of the input register and connects the address bus to the HG RAM 42 by enabling an address buffer 66 typically comprising a pair of 8216 chips and is applied to the CS input of a Bus Driver 68, enabling the operation thereof. An $\overline{RD}$ signal from CPU 22 completes the desired connection of the data bus by selecting $\overline{DIEN}$ which is inputted to the bus driver 68. For clearing the HG RAM 42 the HGM's signal remains unchanged, while the $\overline{RD}$ signal changes state, thus reversing the direction of the bus driver and connecting the data bus onto the data input of HG RAM 42.

As mentioned above, histogram data is accumulated in the CPU main memory over a period of $2^K$ fields, where K=0, 1, ... 8 at the option of the operator. At the end of field $2^K$, the transformation function is recomputed.

The first step in the computation is to add the last partial histogram, as usual, into the cumulative histogram, which takes up 512 bytes in the main memory, 2 bytes per gray level. One byte per level is not sufficient since up to 256 partial histograms are accumulated. For a full video picture it would be appropriate to divide each entry of the cumulative histogram by $2^K$ by shifting it to the right K places, keeping only the lower byte. If only a small window is transformed, the histogram data would be sparse and such a K-place shift would be too drastic to maintain a reasonable level of accuracy. Thus in order to determine the number of shifts K' that should be taken, an average of the last partial histogram is taken. If this average is denoted by the symbol $\bar{h}$, K' is chosen as follows:

| $\bar{h}$ = 16 | K' = K−3≧0 |
|---|---|
| 32 | K−2≧0 |
| 64 | K−1≧0 |

If K' comes out negative it is set to zero. Since K' is determined on the basis of an average, there may occur peaks in the histogram that could cause overflow. Therefore every cumulative histogram entry is checked for 8-bit overflow after shifting. If overflow occurs, the entry is set to 255.

The transformation function may now be calculated except for an a priori unknown scale factor for the desired output distribution. One may know the shape or the normalized value of the output distribution but not its actual value, since the total number of samples is not predictable, but varies with the size of the window and the amount of clipping that occurs due to overflow. Hence a normalization factor must be computed as follows:

$$\overline{Q} = 2^{-8} \cdot \sum_{I=0}^{255} P(I) \quad (1)$$

where I denotes an input level and P(I) denotes its input distribution.

The transformation function algorithm will now be considered: Given an input distribution, $$P(I)=P(0),P(1),P(2),\ldots P(255)$$

and a desired output distribution, $$Q(J)=Q(0),Q(1)\ldots,Q(255)$$

one must find a transformation function $$F(I)=F(0),F(1),\ldots,F(255)$$

that will, for every successive input level I (starting at zero), assign an output level J such that $$\sum_{M=0}^{I} P(M) = \sum_{N=0}^{J} Q(N) \quad (2)$$

At every iteration, the algorithm will strive for equality. It may not reach it exactly due to the discrete nature of the process, but approaches it consistently from one direction:

$$\sum_{M=0}^{I} P(M) \leq \sum_{N=0}^{J} Q(N) \quad (3)$$

| Step 1: | Initialize I=0,ΣP=P(0),J=0,ΣQ=Q(0),F(0)=0. |
|---|---|
| Step 2: | Increment I←I+1; if I=256, exit; accumulate ΣP←ΣP+P(I). |
| Step 3: | If ΣP≦ΣQ, set F(I)←J and return to Step 2. |
| Step 4: | Increment J←J+1; accumulate ΣQ←ΣQ+Q(J); return to Step 3. |

It is noted that the above algorithm is general with respect to the desired output distribution which could be any function. Based on the nature of human brightness perception, it is argued by Werner Frei in the aforementioned article that the optimum output distribution is hyperbolic and that enhancement of images requires histogram hyperbolization. The above algorithm was applied to hyperbolization as well as to equalization and the enhanced video output compared, but no appreciable difference was noted.

For an arbitrary desired output distribution such as the hyperbolic, 256 bytes of memory are needed to store the function and the normalizing factor has to be multiplied by the appropriate function entry whenever a value of Q is required.

Where histogram equalization is being carried out, the output distribution is constant and equal to the normalization factor $\overline{Q}$. As a result, neither additional memory capacity nor additional time for multiplications is required. The execution times and memory requirements given herebelow apply to histogram equalization only.

The memory requirements, in addition to the IT and HG RAMS 20 and 42 respectively, are 1K bytes of ROM and 1K bytes of RAM. The ROM holds all of the above-mentioned routines, while the RAM serves two major functions: 512 bytes are devoted to the cumulative histogram and 256 bytes form a buffer for the incoming partial histogram and outgoing transformation function. Execution times for most of the routines at a 3 MHz clock rate are listed below:

| FUNCTION | TIME (milliseconds) |
|---|---|
| Get partial histogram, clear HG RAM 42 | 2 |
| Accumulate histogram | 5 |
| Compute $\bar{h}$ | 2 |

-continued

| FUNCTION | TIME (milliseconds) |
|---|---|
| Shift and compact cumulative histogram | 4–9 |
| Normalization factor, Q | 2 |
| Main Algorithm | 8–18 |
| Clear cumulative histogram area | 1.2 |
| Put transformation function into IT RAM 20 | 1.5 |

The most time critical routine is to fetch the partial histogram and to clear the HG RAM 42. This is accomplished by setting up the initial HG RAM address (hex 9600) in the stack pointer, the initial buffer address in the CPU HL register and then repeating the following segment:

```
POP      B
MOV      M,C
INR      L
MOV      M,B
INR      L
```

The POP instruction fetches two bytes at a time and increments automatically. Clearing the HG RAM is similarly achieved by repeated PUSH instructions from a double register which is zeroed in advance.

A detailed schematic illustration of a preferred embodiment of apparatus similar to that illustrated in block diagram form in FIG. 1 is provided in FIGS. 2–4. For the sake of conciseness, the schematic illustration will not be described here in detail.

A listing containing the program of the Intel 8085 microprocessor 22 as employed in the apparatus described hereinabove follows:

```
.*
*ØRBACH
TYPE 2708
SDK-85   VER 1.2.
.D8000   83FF 8000 00 00 00 00 00 00 00 3E 00 D3 02 3E CD 30 DB 00
8010 32 06 8B 32 08 8B 3D CA AA 80 06 09 05 17 D2 1C
8020 80 78 32 04 8B C3 43 80 00 00 00 00 00 00 00 00
8030 00 00 00 00 3A 04 8B B7 CA 8F 80 E3 23 23 23 E3
8040 C9 00 00 FB C3 44 80 CD 60 81 3A 08 8B 3D 32 08
8050 8B CA 60 80 3E 00 32 00 95 CD 50 82 C3 43 80 00
8060 3A 06 8B 32 08 8B CD 50 82 CD A0 82 CD D0 81 CD
8070 00 82 00 00 00 FB C3 76 80 CD 00 81 3E 00 32 00
8080 95 CD 70 82 C3 07 80 00 00 00 00 00 00 00 00 F5
8090 3A 0C 8B B7 C2 9C 80 C1 F1 C3 B7 80 3E 00 32 00
80A0 95 32 0C 8B F1 3E F0 30 C9 00 32 04 8B 32 0C 8B
80B0 FB 3E 0D 30 C3 B4 80 3E 03 32 00 95 CD 00 81 3E
80C0 02 32 00 95 CD 60 81 3E FF 32 0C 8B FB CD D0 81
80D0 CD 00 82 FB 3A 0C 8B FE FF CA D4 80 3E 40 30 CD
80E0 D0 81 FB C3 07 80 00 00 00 00 00 00 00 00 00 00
80F0 00 00 00 00 00 00 00 00 00 00 00 00 00 00 00 00
8100 3E 01 32 00 95 21 00 00 39 22 0A 8B 31 00 88 01
8110 00 94 00 00 00 00 C1 71 2C 70 2C C1 71 2C 70 2C
8120 C1 71 2C 70 2C C1 71 2C 70 2C C1 71 2C 70 2C C1
8130 71 2C 70 2C C1 71 2C 70 2C C1 71 2C 70 2C C2 C1
8140 81 2A 0A 8B F9 C9 00 00 00 00 00 00 00 00 00 00
8150 00 00 00 00 00 00 00 00 00 00 00 00 00 00 00 00
8160 3E 02 32 00 95 21 00 00 39 22 0A 8B 31 00 96 21
8170 00 88 00 00 00 00 C1 71 2C 70 2C C1 71 2C 70 2C
8180 C1 71 2C 70 2C C1 71 2C 70 2C C1 71 2C 70 2C C1
8190 71 2C 70 2C C1 71 2C 70 2C C1 71 2C 70 2C C2 76
81A0 81 01 00 00 3E 10 C5 C5 C5 C5 C5 C5 C5 C5 3D C2
81B0 A6 81 2A 0A 8B F9 C9 1E 00 00 00 00 00 00 00 00
81C0 00 00 00 00 00 00 00 00 00 00 00 00 00 00 00 00
81D0 21 00 88 3E 00 0E 00 86 D2 DC 81 0C 2C 86 D2 E2
81E0 81 0C 2C 86 D2 E8 81 0C 2C 86 D2 EE 81 0C 2C C2
81F0 D7 81 0C 79 32 02 8B C9 00 00 00 00 00 00 00 00
8200 21 00 88 06 00 16 00 4E 36 00 3E 00 32 00 8B 3A
8210 02 8B 5F 00 00 00 00 2C C8 79 86 4F D2 20 82 04
8220 78 BA DA 2D 82 C2 34 82 7B B9 DA 34 82 3A 00 8B
```

```
8230  77 C3 17 82 3A 00 8B 3C  32 00 8B 3A 02 8B 83 5F
8240  D2 20 82 14 C3 20 82 00  00 00 00 00 00 00 00 00
8250  11 00 88 21 00 89 1A 86  77 23 D2 5E 82 34 23 1C
8260  C2 56 82 C9 00 00 00 00  00 0C 00 00 00 00 00 00
8270  21 00 00 39 22 0A 8B 31  00 8F 00 00 00 00 00 00
8280  01 00 00 16 20 C5 C5 C5  C5 C5 C5 C5 C5 15 C2 85
8290  82 2A 0A 8B F9 C9 00 00  00 00 00 00 00 00 00 00
82A0  CD D0 81 3A 02 8B FE 10  06 03 DA C0 82 FE 20 06
82B0  02 DA C0 82 FE 40 06 01  DA C0 82 06 00 00 00 00
82C0  21 00 00 39 22 0A 8B 31  00 89 21 00 88 00 00 00
82D0  3A 04 8B 90 FA F0 82 CA  F0 82 32 0E 8B 5F 47 3E
82E0  00 37 17 05 C2 E1 82 2F  57 C3 00 83 00 00 00 00
82F0  C1 78 B7 CA F8 82 0E FF  71 2C C2 F0 82 C3 2B 83
8300  C1 78 A2 CA 10 83 36 FF  2C C2 00 83 C3 2B 83 00
8310  79 A2 4F 7A 2F A0 B1 0F  1D C2 17 83 77 3A 0E 8B
8320  5F 2C C2 00 83 00 00 00  00 00 00 2A 0A 8B F9 C9
8330  00 00 00 00 00 00 00 00  00 00 00 00 00 00 00 00
8340  31 D0 8B 01 00 80 11 00  A0 21 FF A3 C3 60 A3 00
8350  21 CE 20 36 C3 23 36 34  23 36 80 C3 04 80 00 00
8360  E5 62 6B 7E 60 69 77 03  78 B1 CA 08 00 13 E1 CD
8370  A0 06 D2 C8 00 C3 60 A3  00 00 00 00 00 00 00 00
8380  CD 90 05 FE 2F DA 80 A3  CD BC 05 17 17 17 17 E6
8390  F0 57 CD 90 05 FE 2F DA  92 A3 CD BC 05 E6 0F B2
82A0  77 23 C3 80 A3 00 00 00  0C 00 00 00 00 00 00 00
83B0  00 00 00 00 00 00 00 00  00 00 00 00 00 00 00 00
83C0  00 00 00 00 00 00 00 00  00 00 00 00 00 00 00 00
83D0  00 00 00 00 00 00 00 00  00 00 00 00 00 00 00 00
83E0  00 00 00 00 00 00 00 00  00 00 00 00 00 00 00 00
83F0  00 00 00 00 00 00 00 00  00 00 00 00 00 00 00 00
.END
```

The apparatus described above was assembled on three boards, an SDK-85 kit, a small converter board, and a universal breadboard. A number of tests were carried out. One test was a laboratory test designed to demonstrate basic operation and power of enhancement. A video signal generator was used to produce a low amplitude ramp repeated on every horizontal sweep. Outside the enhancement window, which may be designated by a light line, a totally flat light gray image was produced. Inside the enhancement window, at least a dozen graded gray levels, both darker and lighter than the background, were provided.

One important application of the apparatus and techniques described hereinabove is for image data compression, i.e. enabling image data to be transmitted using a lesser number of bits than otherwise while preserving and perhaps improving image quality.

The apparatus and techniques of the present invention have a number of other applications including the replacement of brightness and contrast controls in systems where manual adjustment is impractical and non-linear image enhancement is either required or desirable. Also, since the enhancement system constantly strives to amplify the video signal and bring out any variation or contrast, it may be used to detect and measure the inherent noise and lag of TV cameras. Other applications include restoration in image transmissions, due to the function of image normalization by histogram equalization, normalization of X-ray images and color television transmissions, and the determination of transmission functions in a laboratory.

It will be appreciated by persons skilled in the art that the invention is not limited to the embodiment specifically shown and described herein. Rather the scope of the invention is defined only by the claims which follow.

We claim:

1. Apparatus for on-line data enhancement comprising:
    means for receiving input data;
    means for gathering a histogram of said input data;
    means for providing a histogram transformation function operative to convert said input data to output data having a desired one of a plurality of selectable output histograms, said plurality of selectable output histograms including non-flat histograms; and
    a look up table for applying said histogram transformation function to said input data.

2. Apparatus according to claim 1 and wherein said data comprises image data.

3. Apparatus according to claim 2 and also comprising controllable means for selectably determining what portion of the input data is subject to transformation and selectable bypass means for bypassing said look-up table, said controllable means producing an output signal to said bypass means for defining a selectable window extending over at least part of an image, within which window image data is subject to transformation and outside of which window image data is not subject to transformation and bypasses said look-up table.

4. Apparatus according to claim 3 and wherein said means for selectably determining also determines what portion of the image data is used for determining the histogram transformation function and provides an output signal indicating said window to said providing means.

5. Apparatus according to claim 1 and wherein said look-up table is embodied in a rewritable memory.

6. Apparatus according to claim 1 and wherein said means for providing said histogram transformation function comprises means for periodically updating said transformation function.

7. Apparatus according to claim 1 and wherein said means for providing comprises means for sampling said received data and basing said histogram transformation function on said sampling.

8. Apparatus according to claim 1 and also comprising microprocessor control apparatus for governing the operation thereof.

9. Apparatus according to claim 1 and wherein said providing means also comprises means for data compression.

10. Apparatus according to claim 1 and wherein said providing means also comprises means for adaptive quantization.

11. Apparatus according to claim 1 and wherein said providing means also comprises means for bit truncation.

12. Apparatus according to claim 1 and wherein said data is video image data.

13. Apparatus according to claim 1 and wherein said means for gathering includes selectably operable means for gathering a histogram over a selectable number of fields.

14. A method for applying a histogram transformation to received data comprising the steps of:
receiving input data;
gathering a histogram of said input data;
providing a histogram transformation function operative to convert said input data to output data having a desired one of a plurality of selectable output histograms, said plurality of selectable output histograms including non-flat histograms;
inserting said histogram transformation function into a look-up table embodied in a rewritable memory; and
applying said input data to said look-up table for desired histogram transformation thereof.

15. A method according to claim 14 and also comprising the step of compressing the input data.

16. A method according to claim 14 and also comprising the step of truncating bits of said input data.

17. A method according to claim 14 and also comprising the step of limiting the application of the histogram transformation to a selected portion of the received data.

18. A method according to claim 14 and wherein said data is image data.

19. A method according to claim 14 and wherein said data is video image data.

* * * * *